United States Patent [19]

Schuette et al.

[11] 4,386,178

[45] May 31, 1983

[54] POLYACETALS HAVING AN IMPROVED MAXIMUM SUSTAINED-USE TEMPERATURE

[75] Inventors: Wilhelm Schuette, Speyer; Albrecht Hilt, Ludwigshafen; Manfred Walter, Speyer; Klaus Boehlke, Hessheim, all of Fed. Rep. of Germany

[73] Assignee: BASF Aktiengesellschaft, Fed. Rep. of Germany

[21] Appl. No.: 316,071

[22] Filed: Oct. 28, 1981

[30] Foreign Application Priority Data

Nov. 24, 1980 [DE] Fed. Rep. of Germany ....... 3044118

[51] Int. Cl.$^3$ .................... C08K 5/34; C08L 61/28
[52] U.S. Cl. .................... 524/100; 524/227; 524/291; 524/538; 524/542; 525/398
[58] Field of Search .............. 524/100, 227, 538, 542; 525/398

[56] References Cited

U.S. PATENT DOCUMENTS

| | | | |
|---|---|---|---|
| 3,313,767 | 4/1967 | Berardinelli et al. | 260/45.8 |
| 3,903,197 | 9/1975 | Ishida et al. | 524/542 |
| 3,931,102 | 1/1976 | Grossmann et al. | 524/100 |
| 3,940,365 | 2/1976 | Grossmann et al. | 524/100 |
| 3,960,984 | 6/1976 | Kohan | 260/857 F |
| 3,963,668 | 6/1976 | Wurmb et al. | 524/100 |
| 4,139,575 | 2/1979 | Amann et al. | 260/849 |
| 4,230,606 | 10/1980 | Amann et al. | 525/398 |
| 4,342,680 | 8/1982 | Sugio et al. | 524/100 |

FOREIGN PATENT DOCUMENTS

| | | |
|---|---|---|
| 19761 | 12/1980 | European Pat. Off. . |
| 1029389 | 5/1966 | United Kingdom . |
| 1560863 | 2/1980 | United Kingdom . |

*Primary Examiner*—John Kight, III
*Assistant Examiner*—R. A. White
*Attorney, Agent, or Firm*—Keil & Witherspoon

[57] ABSTRACT

Polyacetal molding materials which contain, as a stabilizer, from 0.1 to 10% by weight of a melamine resin, the latter being a melamine-formaldehyde condensate, having a mean degree of polymerization of from 1.2 to 6.0 and a melamine:formaldehyde ratio of from 1:2 to 1:5.5, which has been partially etherified with a $C_1$–$C_4$-alkanol so that the ratio melamine:ether radicals is from 1:1.5 to 1:5.0 and the ratio melamine:free methylol groups is from 1:0.5 to 1:3. The molding materials can be converted to moldings which can be used industrially at elevated ambient temperatures.

1 Claim, No Drawings

POLYACETALS HAVING AN IMPROVED MAXIMUM SUSTAINED-USE TEMPERATURE

The present invention relates to polyacetals which have been stabilized to sustained exposure to temperatures of 100°–150° C.

Polyacetals stabilized against oxidative attack are to be found in the prior art. The stabilizers employed are antioxidants, eg. sterically hindered phenol derivatives. Such phenol derivatives are listed in, for example, British Pat. No. 1,560,863.

Protection of polyacetals against degradation at elevated temperatures has also been disclosed. Stabilizers for this purpose, usually referred to as heat stabilizers in the literature, are, for example, carboxylic acid amides, high molecular weight polyamides, low molecular weight polyamides with blocked end groups (U.S. Pat. No. 3,960,984), amidine compounds (U.S. Pat. No. 3,313,767), crosslinked, water-insoluble melamine-formaldehyde polycondensates (U.S. Pat. No. 4,139,575), metal salts of aliphatic, hydroxy-substituted carboxylic acids, condensates of dicarboxylic acid diamides, N,N'-alkylureas and formaldehyde, as well as ureas, thioureas, hydrazines, hydrazides, polyvinylpyrrolidone and many other compounds. Moreover, polyacetals can additionally contain light stabilizers and UV stabilizers.

The polyacetals stabilized by the prior art methods have a maximum sustained-use temperature of only about 100° C., even though the crystallite melting point is 167° C. In other plastics, for example polystyrene, the difference between the glass transition temperature and the maximum sustained-use temperature is substantially less.

As an example, storing a polyacetal at 140° C. in a ventilated oven results in degradation of the molecular weight of the polyacetal, so that after a storage time of 56 days the melt index has about doubled. Correspondingly, the mechanical properties deteriorate. Accordingly, polyacetals cannot be employed for any application where relatively high temperatures are expected for a sustained period.

U.S. Pat. No. 3,313,767 proposes, inter alia, to add hexamethoxymethylmelamine and trimethoxymethylmelamine as stabilizers to oxymethylene polymers. Example 4 of British Pat. No. 1,029,389 employs butanol-etherified melamine-formaldehyde resins. It has however been found that such completely etherified melamine resins are incapable of raising the maximum sustained-use temperature of polyacetals. European Patent Application 19,761 proposes adding alkoxymethylmelamines to glass-fiber-reinforced polyoxymethylene molding materials in order to improve their impact strength. The alkoxymethylmelamines proposed are, once again, completely etherified and do not possess any free methylol groups.

None of the stabilizers and antioxidants hitherto proposed, and employed industrially, has been successful in preventing the abovementioned molecular weight degradation at elevated temperatures. It is an object of the present invention to provide a stabilizer which protects polyacetal against molecular weight degradation at from 100° to 150° C.

We have found, surprisingly, that this object is achieved, and the said molecular weight degradation at elevated temperatures can be avoided, by addition of certain methylolated and partially etherified melamine-formaldehyde resins.

Accordingly, the present invention relates to polyacetal molding materials which contain, as a stabilizer, from 0.1 to 10% by weight of a melamine-formaldehyde condensate which has a mean degree of polymerization of from 1.2 to 6.0, preferably from 1.5 to 5.0, and a melamine:formaldehyde ratio of from 1:2 to 1:5.5, preferably from 1:3 to 1:5, and which is partially etherified with a $C_1$–$C_4$-alkanol, preferably with methanol, so that the ratio melamine:ether radicals is from 1:1.5 to 1:5.0, preferably from 1:2 to 1:4, and the ratio melamine:free methylol groups is from 1:0.5 to 1:3, preferably from 1:0.8 to 1:2.

The melamine resins are in general water-soluble and alcohol-soluble and can be added to the polyacetal as corresponding solutions. The (number-average) degrees of polymerization mentioned correspond to molecular weights of from about 200 to 3,000, preferably from about 300 to 1,800.

For the purposes of the invention, polyacetals are, in particular, macromolecular copolymers of trioxane with from 0.01 to 20, in particular from 0.1 to 5, mole percent, based on total monomers, of copolymerizable compounds which introduce recurring alkylene units, and in particular oxyalkylene units having not less than two, and preferably from 2 to 4, adjacent carbon atoms, into the polymer chain, for example copolymers of trioxane with cyclic acetals or cyclic ethers, especially of 3 to 8 carbon atoms, which have an appropriate structure, eg. ethylene oxide, 1,3-dioxolane, 1,3-dioxane, 2-methoxymethyldioxolane, butane-1,4-diol-formal or diglycol-formal, or copolymers of trioxane with linear polyacetals having recurring acetal groups in the main molecular chain, eg. polydioxolane and, in particular, polyformals.

The addition of from 0.1 to 10%, preferably from 0.25 to 5%, of a methylolated and partially etherified melamine-formaldehyde resin to a conventionally stabilized polyacetal has the effect that on storage of the polyacetal at from 100° to 150° C., molecular weight degradation only occurs to a very greatly reduced degree, if at all.

In addition to the melamine-formaldehyde resin, the copolymer preferably contains a conventional antioxidant and a conventional heat stabilizer. The relevant prior art has already been mentioned at the outset. The polyacetal can furthermore contain nucleating agents, colorants and/or fillers, for example glass fibers.

The melamine-formaldehyde resin according to the invention can be incorporated into the polyacetal on conventional processing machinery, for example in an extruder at from 180° to 240° C. Preferably, the polyacetal used is a copolymer in which the unstable end groups have been removed by hydrolytic or thermal degradation, and which is in powder or granule form. It is however also possible to mix the melamine-formaldehyde resin with the crude polymer before the thermal degradation step, and to work it into the copolymer during this thermal degradation.

The polyacetals stabilized according to the invention can be repeatedly melt-processed without degradation of the molecular weight and without discoloration. The stabilized polyacetals are particularly suitable for the production of moldings which are employed industrially at elevated ambient temperatures.

The following stabilizers are employed in the Examples:

A. As an antioxidant in all the Examples: 0.3% of hexane-1,6-diol bis-3-(3,5-di-tert.-butyl-4-hydroxyphenyl)-propionate (®Irganox 259 from Ciba-Geigy).

B. As heat stabilizers:

B1: 0.4% of a condensate of isophthalic acid diamide, ethyleneurea and formaldehyde, as described in Example 1 of German Published Application DAS No. 1,669,692.

B2: 0.1% of a low molecular weight polyamide with blocked end groups, as described in U.S. Pat. No. 3,960,984.

C. As melamine resins:

C1: A melamine-formaldehyde polycondensate as described in Example 1 of German Published Application DAS No. 2,540,207

C2: Hexamethyoxymethylmelamine

C3: A partially methanol-etherified melamine-formaldehyde condensate having a (number-average) mean degree of polymerization of 1.9, a melamine:formaldehyde ratio of 1:3.4, a ratio melamine:ether radicals of 1:2.2 and a ratio melamine:methylol groups of 1:0.9.

C4: A methanol-etherified melamine-formaldehyde condensate having a (number-average) mean degree of polymerization of 2.5, a melamine:formaldehyde ratio of 1:4.2, a ratio melamine:ether radicals of 1:2.9 and a ratio melamine:methylol groups of 1:1.3.

In the Examples, parts and percentages are by weight. Experiments 4, 5, 7, 8, 9, 10 and 12 are according to the invention.

EXAMPLE 1

A crude polyacetal of 97.3% of trioxane and 2.7% of butanediol-formal, which still contained about 3% of unconverted trioxane and about 5% of unstable constituents, was thoroughly mixed, in a dry blender, with antioxidant and heat stabilizer, with or without melamine resin. This mixture was then freed from volatile constituents, and granulated, on a devolatilizing extruder at 220° C. Standard small bars (according to DIN 53,453) were then injection-molded from these granules, and were stored in a ventilated oven at 140° C. for up to 56 days. After the storage times shown, a proportion of the bars was taken from the oven, and the melt index, according to DIN 53,735 [2.16 kg, 190° C., 10'] was determined on these samples, to serve as a measure of the molecular weight. The values obtained are shown in Table 1.

EXAMPLE 2

The crude polyacetal described in Example 1 was thoroughly mixed, in a dry blender, with antioxidant and heat stabilizer, with or without the etherified melamine-formaldehyde resin according to the invention. This mixture was then freed from volatile constituents, and granulated, on a devolatilizing extruder. Thereafter, the granules were passed four times through a twin-screw extruder at 220° C. The melt index was measured after each extrusion. The results are summarized in Table 2.

TABLE 1

| Ex-periment | Heat stabilizer | Melamine resin | Initial | Melt index 14 days | 28 days | 42 days | 56 days |
|---|---|---|---|---|---|---|---|
| 1 | B1 | — | 13.2 | 14.2 | 16.6 | 21.3 | 29.7 |
| 2 | B1 | 1% C1 | 14.6 | 16.2 | 19.2 | 19.3 | 25.0 |
| 3 | B1 | 1% C2 | 13.6 | | 18.2 | | 29.3 |
| 4 | B1 | 1% C3 | 11.3 | 9.3 | 9.5 | 9.6 | 10.3 |
| 5 | B1 | 1% C4 | 11.5 | 9.8 | 9.7 | 9.5 | 9.5 |
| 6 | B2 | — | 12.3 | | 15.6 | | 22.9 |
| 7 | B2 | 0.25% C3 | 11.6 | 11.5 | 11.6 | 12.0 | 12.7 |
| 8 | B2 | 0.5% C3 | 11.4 | 11.2 | 11.1 | 11.5 | 11.9 |
| 9 | B2 | 1% C3 | 11.4 | 9.4 | 9.5 | 9.7 | 9.8 |
| 10 | B2 | 5% C3 | 11.0 | 7.3 | 6.7 | 6.3 | 6.1 |

TABLE 2

| Ex-periment | Heat stabilizer | Melamine resin | Melt index after extruding the mixture Once | Twice | 3 times | 4 times | 5 times |
|---|---|---|---|---|---|---|---|
| 11 | B2 | — | 11.3 | 11.7 | 12.3 | 12.8 | 13.3 |
| 12 | B2 | 1% C3 | 10.5 | 9.8 | 9.5 | 9.4 | 9.3 |

We claim:

1. A polyacetal molding material containing an antioxidant and a heat stabilizer, which molding material is further stabilized with a melamine resin, which molding material contains from 0.1 to 10% by weight of a melamine-formaldehyde condensate which has a mean degree of polymerization of from 1.2 to 6.0 and a melamine:formaldehyde ratio of from 1:2 to 1:5.5 and which is partially etherified with a $C_1$–$C_4$-alkanol so that the ratio melamine:ether radicals is from 1:1.5 to 1:5.0 and that the ratio melamine:free methylol groups is from 1:0.5 to 1:3.

* * * * *